(12) United States Patent
Martinsen

(10) Patent No.: US 10,530,970 B2
(45) Date of Patent: Jan. 7, 2020

(54) AUTOMATIC OUTPUT METADATA DETERMINATION BASED ON OUTPUT DEVICE AND SUBSTRATE

(71) Applicant: Microsoft Technology Licensing, LLC, Redmond, WA (US)

(72) Inventor: Ronald R. Martinsen, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/255,586

(22) Filed: Sep. 2, 2016

(65) Prior Publication Data

US 2018/0069989 A1 Mar. 8, 2018

(51) Int. Cl.
*H04N 1/60* (2006.01)
*H04N 1/00* (2006.01)

(52) U.S. Cl.
CPC ....... *H04N 1/6094* (2013.01); *H04N 1/00129* (2013.01); *H04N 1/00267* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,398,305 A * | 3/1995 | Yawata | B41J 11/48 358/1.1 |
| 5,871,288 A * | 2/1999 | Ryan, Jr. | G06K 5/00 400/103 |
| 6,210,052 B1 | 4/2001 | Smith | |
| 6,651,975 B2 | 11/2003 | Ohtsuka et al. | |
| 6,731,393 B1 | 5/2004 | Currans et al. | |
| 6,761,422 B2 * | 7/2004 | Smith, II | B41J 29/393 347/14 |
| 6,873,435 B1 * | 3/2005 | Tehranchi | H04N 1/32128 358/1.9 |
| 6,963,411 B1 | 11/2005 | Billow et al. | |

(Continued)

OTHER PUBLICATIONS

Pawle, et al., "Evolution of the ICC profile connection space", In Proceedings of SPIE, 9th Congress of the International Colour Association, vol. 4421, Jun. 6, 2002, 2 pages.

(Continued)

*Primary Examiner* — Anh-Vinh T Nguyen
(74) *Attorney, Agent, or Firm* — Newport IP, LLC; Mike R. Cicero

(57) ABSTRACT

Various different output devices (e.g., printers, display devices) can be used to output content on various different substrates (e.g., paper, projector screens, painted walls or wallpaper). A data store stores output metadata for various output device and substrate combinations. The output metadata for an output device and substrate combination describes various different aspects of how that output device is to output color on that substrate. A computing device coupled to an output device obtains an identifier of the output device and an identifier of the substrate. The computing device communicates uses these identifiers to retrieve from the data store (e.g., directly or via a service) the output metadata for the output device and the substrate. The computing device uses the output metadata to generate output parameters for use when outputting content to the substrate.

20 Claims, 5 Drawing Sheets

(56) References Cited

U.S. PATENT DOCUMENTS

| | | | |
|---|---|---|---|
| 7,068,380 B2 | 6/2006 | Milton et al. | |
| 7,145,677 B2 | 12/2006 | Shimbori et al. | |
| 7,248,382 B2 | 7/2007 | Haines et al. | |
| 7,298,513 B2 | 11/2007 | Namikata | |
| 7,307,755 B2 | 12/2007 | Delang et al. | |
| 7,554,694 B2 | 6/2009 | Itagaki | |
| 7,557,950 B2 | 7/2009 | Hatta et al. | |
| 7,599,634 B2 | 10/2009 | Kuo et al. | |
| 7,920,759 B2* | 4/2011 | Hull | G06F 17/3002 358/3.28 |
| 2002/0178128 A1* | 11/2002 | Chen | G06Q 30/0283 705/400 |
| 2003/0205863 A1* | 11/2003 | Yang | B65H 5/38 271/264 |
| 2004/0021879 A1 | 2/2004 | Castelltort et al. | |
| 2004/0236789 A1* | 11/2004 | Uchida | G06F 3/1205 |
| 2006/0013602 A1* | 1/2006 | Lee | G03G 15/2046 399/45 |
| 2006/0017960 A1* | 1/2006 | Kakigi | H04N 1/00923 358/1.14 |
| 2006/0132822 A1* | 6/2006 | Walmsley | G06F 12/1408 358/1.14 |
| 2006/0139681 A1* | 6/2006 | Walmsley | G06F 21/445 358/1.14 |
| 2007/0046982 A1* | 3/2007 | Hull | G06K 9/00442 358/1.15 |
| 2007/0052997 A1* | 3/2007 | Hull | G06K 9/00463 358/1.15 |
| 2007/0091331 A1* | 4/2007 | Ohashi | G06F 3/1205 358/1.2 |
| 2007/0120875 A1* | 5/2007 | Aygar | G06F 3/1206 345/689 |
| 2007/0247664 A1* | 10/2007 | Yamamoto | G06F 3/1203 358/1.16 |
| 2010/0214598 A1* | 8/2010 | Hoppenot | G06F 3/1205 358/1.15 |
| 2010/0238496 A1* | 9/2010 | Oshima | G06F 3/1203 358/1.15 |
| 2011/0143811 A1* | 6/2011 | Rodriguez | G06K 9/00986 455/556.1 |
| 2012/0069397 A1* | 3/2012 | Bury | B41J 3/50 358/1.15 |
| 2012/0275642 A1* | 11/2012 | Aller | H04M 1/72522 382/100 |
| 2013/0033714 A1* | 2/2013 | Nakagawa | G06F 3/1205 358/1.9 |
| 2013/0243510 A1* | 9/2013 | Supron | B41J 11/008 400/583 |
| 2014/0080428 A1* | 3/2014 | Rhoads | G06F 17/30241 455/88 |
| 2015/0092233 A1* | 4/2015 | Park | G06F 3/1288 358/1.15 |
| 2015/0103372 A1* | 4/2015 | Wang | G03G 15/6552 358/1.15 |
| 2015/0130912 A1* | 5/2015 | Fisher | H04N 5/4403 348/552 |
| 2015/0244878 A1* | 8/2015 | MacAuley | G06F 3/1204 358/1.2 |
| 2015/0281507 A1* | 10/2015 | Konen | H04N 1/2112 348/231.6 |
| 2015/0371411 A1* | 12/2015 | Jitkoff | G06F 3/0482 715/762 |
| 2016/0216923 A1* | 7/2016 | Willamowski | G06F 3/1219 |
| 2016/0241744 A1* | 8/2016 | Xu | H04N 1/54 |
| 2016/0328667 A1* | 11/2016 | Macciola | G06Q 10/0633 |
| 2016/0364636 A1* | 12/2016 | Kosinski, II | G06K 19/06037 |
| 2017/0004147 A1* | 1/2017 | Ozawa | H04N 1/2191 |
| 2017/0011051 A1* | 1/2017 | Specht | G06F 17/30073 |
| 2017/0052744 A1* | 2/2017 | Langeveld | G06F 3/1203 |
| 2017/0195008 A1* | 7/2017 | Ko | H04B 5/0031 |
| 2019/0188002 A1* | 6/2019 | Otsuka | G06F 3/1204 |

OTHER PUBLICATIONS

Martinsen, Ron, "How to use Epson Luster in Photoshop CS6 for Windows on Epson Printers", Published on: Mar. 1, 2013 Available at: https://www.youtube.com/watch?v=XNOVHBe_z20.

Martinsen, Ron, "Epson Legacy Fibre Paper Tutorial on OS X using Photoshop & Lightroom", Published on: Feb. 17, 2016 Available at: https://www.youtube.com/watch?v=8F_clcQI9WU.

* cited by examiner

AUTOMATIC OUTPUT METADATA DETERMINATION BASED ON OUTPUT DEVICE AND SUBSTRATE

BACKGROUND

As computing devices have become increasingly commonplace, users' desire to share the content they have on their devices with others has increased. This sharing can take various forms, such as printing out content, projecting content onto a screen or other display device, and so forth. While sharing content is a feature many users enjoy, it is not without its problems. One problem with sharing content is that given the wide variety of different output devices available as well as substrates on which the content can be output, the colors of the same content by different output devices and/or on different substrates can vary greatly. This can lead to poor output results, and user dissatisfaction with their devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an identifier of a substrate on which content is to be output is automatically obtained from packaging of the substrate. An output device to be used to output the content on the substrate is identified. A data store is accessed to retrieve output metadata, the output metadata corresponding to both the substrate and the output device. The output metadata is used to determine output parameters for the output device to output the content on the substrate.

In accordance with one or more aspects, a computing device includes an output parameter identification system and a display device driver. The output parameter identification system is configured to obtain an identifier of a substrate on which content is to be output, to identify a display device to be used to output the content on the substrate, and to access a data store to retrieve output metadata, the output metadata corresponding to both the substrate and the display device. The display device driver is configured to use the output metadata to determine output parameters for the display device to output the content on the substrate.

In accordance with one or more aspects, a request for print metadata corresponding to a particular substrate and a particular printer is received from a computing device. The request includes an identifier of the particular printer and an identifier of the particular substrate, the identifier of the particular substrate having been automatically obtained from packaging of the substrate or the particular printer. A print metadata store including multiple entries is accessed, each entry identifying print metadata for an identified substrate and an identified printer. The received identifier of the particular printer is compared to the identifiers of printers in the multiple entries and the received identifier of the particular substrate is compared to the identifiers of substrates in the multiple entries to identify an entry corresponding to the particular printer and the particular substrate. The print metadata included in the entry corresponding to the particular printer and the particular substrate is communicated to the computing device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
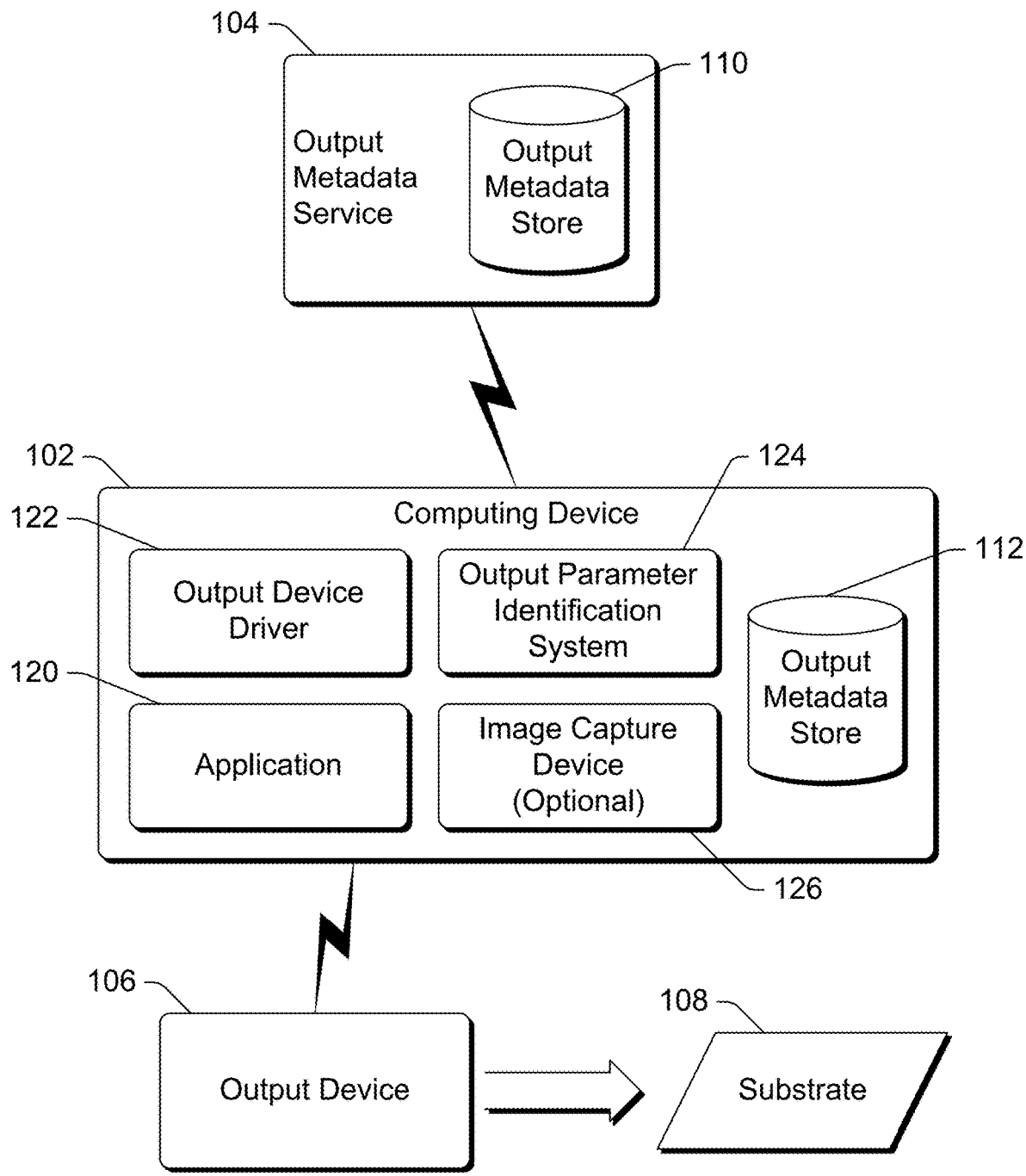
FIG. 1 illustrates an example system implementing the automatic output metadata determination based on output device and substrate in accordance with one or more embodiments.

Automatic output metadata determination based on output device and substrate is discussed herein. Various different output devices can be used to output content on various different substrates. Output devices can include, for example, printers (e.g., inkjet printers, laser printers, 3-dimensional (3D) printers, plotters, etc.), display devices (e.g., projectors, devices with liquid crystal display (LCD) panels), and so forth. The substrate refers to the surface or item on which the output is printed or otherwise presented, such as paper, vinyl, acrylic, walls, screens, LCD panels, and so forth.

An output metadata service maintains a data store with output metadata for various output device and substrate combinations. Generally, the output metadata for an output device and substrate combination describes various different aspects of how the output device is to output color on the substrate. This can include, for example, an International Color Consortium (ICC) color profile and substrate type selection.

A computing device coupled to an output device includes an output parameter identification system that accesses a data store with output metadata for various output device and substrate combinations. The output parameter identification system can access the data store of the output metadata service and/or a local data store of the computing device. The output parameter identification system obtains an identifier of the output device, such as by user selection of an output device. The output parameter identification system also obtains an identifier of the substrate, such as by reading a quick response (QR) code on the packaging that contains the substrate, by reading a bar code on the packaging that contains the substrate, by capturing an image of the packaging that contains the substrate for an image recognition lookup, and so forth.

The output parameter identification system uses these identifiers to obtain output metadata from a data store to generate output parameters for use when outputting content to the substrate. For example, the output parameter identification system can communicate these identifiers to the output metadata service along with a request for the output metadata associated with that output device and substrate combination. The output metadata service retrieves the output metadata based on the identifiers of the output device and the substrate and returns the output metadata to the output parameter identification system. The output parameter identification system uses the output metadata to generate output parameters for use when outputting content to the substrate.

The techniques discussed herein provide a user-friendly mechanism for outputting content on various different substrates in a manner that is visually appealing to users. The content is output accurately (e.g., colors are what the user expects) with little intervention on the part of the users. For example, a user can print out pictures on a home inkjet printer using multiple different types of paper and have the printed pictures faithfully represent the colors and/or appear with accurate color regardless of which paper he or she uses. By way of another example, a user can have images sent from his or her computer to a projector and have the images displayed on a screen by the projector with the same colors as seen on his or her computer. The user need not have detailed knowledge of what the differences between the different papers or possible projectors are, need not understand what changes need be made in order to accommodate those differences, and need not attempt to accurately input numerous different settings in order to obtain an appealing output. Rather, the user can simply, for example, use his or her device to capture an image of the packaging of the substrate, have the substrate automatically identified for him or her, and have an output with accurate color generated.

The techniques discussed herein further provide a user-friendly mechanism for using small mobile devices to print out content. The user need not interact with a cumbersome user interface in order to select the appropriate type of substrate and/or provide the appropriate settings for the output parameters. Rather, the user can simply, for example, use his or her mobile device to capture an image of the packaging of the substrate or read a QR code on the packaging of the substrate, manually input a value based on information on the packaging of the substrate, and so forth, and have the substrate automatically identified for him or her.

FIG. 1 illustrates an example system 100 implementing the automatic output metadata determination based on output device and substrate in accordance with one or more embodiments. System 100 includes a computing device 102. The computing device 102 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

The computing device 102 can communicate with an output metadata service 104 via a variety of different networks, including the Internet, a local area network (LAN), a public telephone network, an intranet, other public and/or proprietary networks, combinations thereof, and so forth. Similar to the discussion of computing device 102, the output metadata service 104 can be implemented using a variety of different devices, ranging from one or more full resource devices with substantial memory and processor resources to one or more low-resource devices with limited memory and/or processing resources. The computing device 102 and the output metadata service 104 communicate with one another via a network, and thus are also referred to as being remote from one another.

The computing device 102 also communicates with an output device 106. The output device 106 can be any of a variety of different types of devices capable of outputting color on a substrate 108. As discussed above, the output device 106 can be, for example, a printer (e.g., inkjet printers, laser printers, 3-dimensional (3D) printers, plotters, etc.), a display device (e.g., a projector, a device incorporating an LCD panel), and so forth. The substrate refers to the surface or item on which the output device 106 outputs the color, such as paper, vinyl, wood, acrylic, metal, fabric, painted walls or wallpaper, projector screens, whiteboards, LCD panels, and so forth.

The computing device 102 and the output device 106 can communicate with one another via any of a variety of different connections. The computing device 102 and the output device 106 can be coupled to one another via a wired or wireless connection, such as a USB (universal serial bus) connection, a wireless USB connection, an infrared connection, a Bluetooth connection, a DisplayPort connection, a PCI (a peripheral component interconnect) Express connection, and so forth. The computing device 102 and the output device 106 can alternatively or additionally be connected to one another via a data network, such as the Internet, a local area network (LAN), a public telephone network, an intranet, other public and/or proprietary networks, combinations thereof, and so forth using any of a variety of different protocols or transports such as TCP/IP (Transmission Control Protocol/Internet Protocol).

The output metadata service 104 maintains, in an output metadata store 110, output metadata for various output device and substrate combinations. An output device and substrate combination refers to the output device in the combination being used to output content onto the substrate in the combination. The output metadata store 110 can be implemented using various different storage devices, such as a magnetic disk drive, solid state memory, and so forth. In one or more embodiments, the output metadata service 104 maintains a record or entry for each of multiple output device and substrate combinations. Alternatively, various different tables, databases, or other data structures can be used to maintain the output metadata for different output device and substrate combinations. The output metadata can be referred to in different manners based on the output device 106. For example, if the output device 106 is a printer, then the output metadata can be referred to as print metadata. By way of another example, if the output device 106 is a display device, then the output metadata can be referred to as display metadata.

Additionally or alternatively, the computing device 102 includes an output metadata store 112. The output metadata store 112 is analogous to the output metadata store 110, but stores data locally for the computing device 102 rather than remotely. Although illustrated as part of the computing device 102 (e.g., such as an internal storage device), the output metadata store 112 can be external to and coupled to the computing device 102, such as via a wired or wireless connection (e.g., a USB connection, a wireless USB connection, an infrared connection, a Bluetooth connection, a DisplayPort connection). The output metadata store 112 can store the same output metadata as is stored by the output metadata store 110, or alternatively different output metadata. For example, the output metadata store 112 can store a subset of the output metadata stored by the output metadata store 110. This subset of output metadata can be specified in different manners, such as by the output metadata service 104, by the computing device 102, and so forth.

Figure 2:
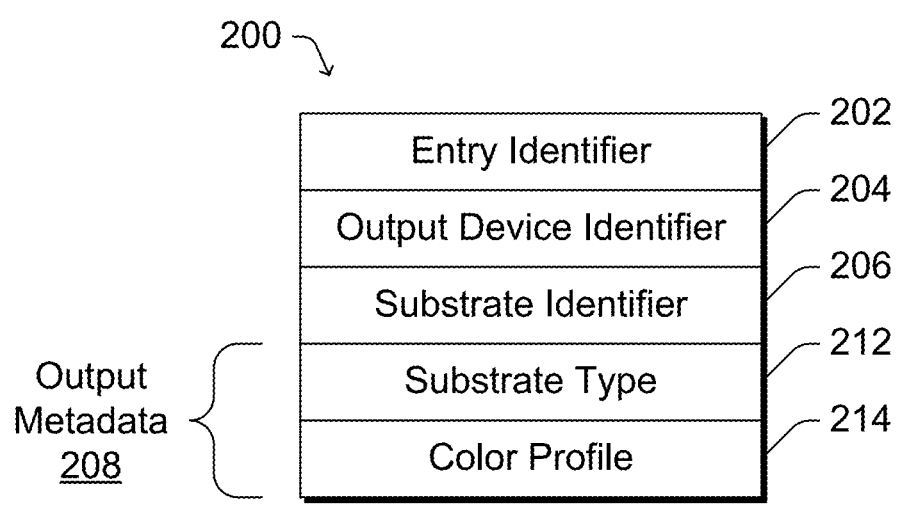
FIG. 2 illustrates an example data structure maintaining information for an output device and substrate combination.

FIG. 2 illustrates an example data structure 200 maintaining information for an output device and substrate combination. The data structure 200 includes an entry identifier 202, an output device identifier 204, and a substrate identifier 206. The entry identifier 202 is any of a variety of different identifiers, such as a string of alphanumeric characters, allowing different data structures maintaining information for different output device and substrate combinations to be distinguished from one another.

The output device identifier 204 is an identifier of a particular output device, allowing different output devices to be distinguished from one another. The output device identifier 204 can take various forms, such as a manufacturer and model of the output device.

The substrate identifier 206 is an identifier of a particular substrate, allowing different substrates to be distinguished from one another. As used herein, a substrate refers to a particular type of substrate having a particular set of characteristics. The set of characteristics can include different characteristics, such as substrate manufacturer, substrate thickness, substrate texture, substrate absorbency, substrate color, substrate size, substrate brightness, and so forth. Multiple instances of a substrate typically exist (e.g., many different sheets of paper exist having the same characteristics), but if any of the set of characteristics of the substrate are different then the substrates are different (e.g., two sheets of paper having the same size, texture, weight, and manufacturer but different thicknesses and/or absorbencies are two different substrates). The substrate identifier 206 can take various different forms. In one or more embodiments, the substrate identifier 206 is a string of characters (e.g., alphanumeric characters). Additionally or alternatively, the substrate identifier 206 can take other forms. For example, the substrate identifier 206 can be one or more values representing an image of substrate packaging (e.g., the box, envelope, or other packaging that contains the substrate).

The data structure 200 also includes output metadata 208. The output metadata 208 describes, for the output device identified by the output device identifier 204 when outputting content to the substrate identified by the substrate identifier 206, various different aspects of how the output device is to output color on the substrate. In general, the output metadata can be used to determine how the output device is to output color on the substrate so that the result is visually appealing to a user (e.g., has a faithful or accurate representation of the colors).

In the example of FIG. 2, the output metadata 208 is illustrated as including a substrate type 212 and a color profile 214. It should be noted, however, that these are examples of metadata, and that all of this metadata need not be maintained and/or that additional metadata can be included in the data structure 200 (e.g., a type of ink (such as whether the ink is photo ink or matte ink), a substrate size, and so forth). It should further be noted that all of this metadata need not be provided in response to a request for the output metadata. For example, the output metadata 208 may be more metadata than the requester desires, and a subset of the output metadata 208 is provided to the requester.

The substrate type 212 provides an indication of a type of the substrate on which the content is being output. In one or more embodiments, substrates having the same substrate identifier can have different substrate types. For example, paper may be resin coated or have matte finish. Alternatively, some substrates may not have different substrate types corresponding to the same substrate identifier, in which case the data store 200 need not include the substrate type 212. The substrate type 212 provides an indication of at least some of the characteristics of the substrate, such as the thickness of the substrate, how the substrate absorbs ink, how long it takes for ink to dry on the substrate, how far away from the substrate a print head should be, and so forth.

The color profile 214 indicates how the color output by the output device identified by the output device identifier 204 when outputting content to the substrate identified by the substrate identifier 206 differs from a standard or reference set of colors. This allows adjustments to be made by the output device when output the content on the substrate so that the colors of the content appear as intended or desired by a user of the output device. In one or more embodiments, the color profile 214 is an International Color Consortium (ICC) color profile in accordance with the ICC v2 specification (e.g., as described in the International Color Consortium Specification ICC.1:2001-04 (2001)). It should be noted, however, that the color profile 214 can additionally or alternatively be a color profile in accordance with different specifications (e.g., different ICC specifications).

In one or more embodiments, rather than including the color profile itself, the data structure 200 includes a link to or other identification of the location of the color profile. For example, rather than containing the actual color profile, the color profile 214 can be a uniform resource locator (URL) of a location where the actual color profile is stored, and the computing device 102 can use that URL to retrieve the actual color profile from that location.

Various additional metadata can optionally be included in the output metadata 208. For example, the size of the substrate can be included as output metadata 208. This size can include, for example, the width and length of the substrate, the diameter of the substrate, the shape of the substrate (e.g., rectangular), and so forth. This size can also indicate a third dimension of the substrate, such as the depth or height of the substrate.

Returning to FIG. 1, the computing device 102 includes an application 120, an output device driver 122, an output parameter identification system 124, and optionally an image capture device 126. The application 120 can be any of a variety of different applications that desire to output content on a substrate, such as an image editing or organizing application that prints pictures, a slideshow or presentation application that displays slides or images on a projector, and so forth. The content can be any information that can be displayed to a user, such as an image, drawing, graph, 3D object, and so forth.

The output device driver 122 operates as an interface between the output device 106 and the application 120. The output device driver 122 translates commands and data received from the application 120 into a format expected by the output device 106. The output device driver 122 can also provide information received from the output device 106 (e.g., information regarding the status of the output device 106) to the application 120. The output device driver 122 can be specific to a particular output device 106 (e.g., a particular manufacturer and model of output device) or can be specific to a group or family of output devices 106 (e.g., a set of multiple models from the same manufacturer).

The output parameter identification system 124 obtains an identifier of the output device 106, an identifier of the substrate 108, and communicates with the output metadata service 104 and/or the output metadata store 112 to obtain the output metadata for the particular output device 106 and substrate 108 combination. The obtained output metadata is then used to determine output parameters for the output device 106 outputting content to the substrate 108. These output parameters can take a variety of different forms, such as how to output particular colors. Different combinations of ink colors, toner colors, pixel elements, and so forth can be used to output a particular color and this combination can change for different substrates. The appropriate combination to output a particular color for a particular substrate can vary based on multiple different characteristics of the substrate, such as the absorbency of the substrate, the thickness of the substrate, the color of the substrate, and so forth. The output metadata specifies these characteristics for the substrate, allowing the output parameters for the substrate to be determined. Any of a variety of different public and/or proprietary techniques can be used to generate the output parameters from the output metadata.

Various additional output parameters can be determined based on the output metadata. For example, one output parameter can be a print speed. The time taken for ink to dry on different substrates can vary, so the print speed may be altered so allow a previous line to dry before printing a subsequent line. By way of another example, one output parameter can be print head distance. The appropriate distance away from the substrate that a print head should be positioned can vary for different substrates, and the appropriate distance can be determined based on the output metadata.

By way of yet another example, one output parameter can be input material temperature. For some output devices (e.g., 3D printers), input material is received and used to generate the output. The input material can also be referred to as the substrate, although the input material is transformed (e.g., melted) to generate the output rather than printing or displaying content on a substrate. For some output devices (e.g., a 3D printer), the input material is raised or lowered to a particular temperature for proper output, and this temperature can vary for different substrates. The appropriate temperature for a particular substrate is determined based on the output metadata.

In one or more embodiments, the output device driver 122 generates the output parameters based on the output metadata for the output device 106 and the substrate 108. Alternatively, the application 122 or the output parameter identification system 124 generates the output parameters based on the output metadata for the output device 106 and the substrate 108. Alternatively, a combination of two or more of the output device driver 122, the application 120, and the output parameter identification system 124 generates the output parameters based on the output metadata for the output device 106 and the substrate 108. For example, the output device driver 122 can generate a subset of the output parameters and the application 120 can generate a different subset of the output parameters.

In the illustrated example of FIG. 1, the output parameter identification system 124 is illustrated as separate from the application 120 and the output device driver 122. The output parameter identification system 124 can be implemented as, for example, a program or module of an operating system of the computing device 102. In such situations, the output parameter identification system 124 exposes functionality (e.g., an application programming interface (API) having one or more methods) that can be invoked by the application 120 and/or the output device driver 122 to request that the output parameter identification system 124 obtain the output metadata for the combination of the output device 106 and the substrate 108. The application 120 and/or output device driver 122 can also optionally provide identifiers of the output device 106 and/or substrate 108 to the output parameter identification system 124.

Alternatively, the output parameter identification system 124 can be implemented at least in part in the output device driver 122 and/or the application 120. For example, the output parameter identification system 124 can be implemented in the output device driver 122, in which case the output parameter identification system 124 within the output device driver 122 communicates with the output metadata service 104 and/or the output metadata store 112 to obtain the output metadata for the combination of the output device 106 and the substrate 108.

The output parameter identification system 124 obtains an identifier of the output device 106. The identifier of the output device 106 can be obtained in various different manners. In one or more embodiments, the identifier of the output device 106 is received as a user input (e.g., to the computing device 102) specifying the output device 106, such as selection of the output device 106 from a user interface listing of possible output devices 106. Additionally or alternatively, the identifier of the output device can be obtained in other manners, such as a default setting of the computing device 102 or the application 120, from another device or service, and so forth. The obtained identifier of the output device 106 is, for example, a manufacturer name and model of the output device 106.

The output parameter identification system 124 also obtains an identifier of the substrate 108. In one or more embodiments, the identifier is obtained automatically by the output parameter identification system 124 based on the substrate packaging. The substrate packaging refers to the box, envelope, or other packaging that contains the substrate (e.g., the packaging in which the substrate is shipped, marketed, sold, etc.).

In one or more embodiments, the identifier is obtained by reading a quick response (QR) code on the substrate packaging or by reading a bar code on the substrate packaging. The QR code or bar code has encoded therein the identifier of the substrate 108. The computing device 102 optionally includes an image capture device 126, which can be any of a variety of different image capture devices (e.g., a charge-coupled device (CCD) or complementary metal-oxide-semiconductor (CMOS) device). A QR code or bar code can be read by a program of the computing device 102 (e.g., the output parameter identification system 124) via images captured by the image capture device 126. Thus, for example, if the computing device 102 is a mobile device (e.g., a smartphone), the identifier of the substrate 108 can be obtained by the user using the mobile device's camera to read the QR code or bar code on the substrate packaging. It should be noted that the QR code and the bar code are examples and that various other numbers and mechanisms can similarly be used.

In one or more embodiments, the identifier is obtained by capturing an image of the packaging that contains the substrate. Rather than reading a QR code or bar code on the substrate packaging, a packaging recognition technique can be used to identify the substrate packaging. Different substrate packaging has different features, such as colors, wording, layout, and so forth. These different features can be identified and used to identify the substrate packaging using any of a variety of public and/or proprietary object recognition techniques. The identified substrate packaging can be used to identify the appropriate output metadata from the output metadata store 110 and/or output metadata store 112 as discussed in more detail below. Thus, for example, if the computing device 102 is a mobile device (e.g., a smartphone), the identifier of the substrate 108 can be obtained by the user taking a picture of the QR code or bar code on the substrate packaging. This image can itself be the identifier of the substrate 108.

Additionally or alternatively, the output device 106 can also be used to identify the substrate 108. In some situations, such as those in which the output device 106 is a multi-function device (e.g., printer and scanner), the output device 106 includes an image capture device. Rather than using the image capture device 126 of the computing device 102, the image capture device that is typically used by the output device 106 to scan documents, pictures, or other media is used to scan the substrate packaging. The scanning of the substrate packaging results in an image of the packaging that can be used with various object recognition techniques as discussed above. Additionally or alternatively, the substrate packaging can include a QR code or bar code that is in the image scanned from the substrate packaging by the output device 106, and the output parameter identification system 124 or other program of the computing device 102 can read the scanned QR code or bar code.

Thus, in one or more embodiments, the substrate 108 can be automatically identified by simply scanning or capturing an image of the substrate packaging. In such embodiments, the substrate 108 itself need not be analyzed and the user need not attempt to identify the appropriate identifier for the substrate 108. Rather, the user can simply capture an image of the substrate packaging and rely on the output parameter identification system 124 to determine the identifier of the substrate 108 from the captured image.

Additionally or alternatively, the output parameter identification system 124 can obtain the identifier of the substrate 108 in other manners. For example, user input describing the substrate 108 (e.g., the alphanumeric characters of a universal product code (UPC) on the substrate packing, a personal identification number (PIN) on the substrate packaging) can be the identifier of the substrate 108. Thus, for example, if the output device is a display device and the substrate 108 is an LCD panel of the display device, user input of the UPC code on the packaging of the display device can be provided as the identifier of the substrate 108. By way of another example, a user input choosing the substrate can be received at the output device 106 (e.g., when the substrate is loaded into the output device 106). The output parameter identification system 124 can query output device 106 for the substrate identifier, and provide an indication of that substrate as a default option to the user in a user interface. The user can select to proceed with the default option, or have another substrate identifier obtained using any of the techniques discussed above.

The output parameter identification system 124 communicates a request to the output metadata service 104 for the output metadata for the combination of the output device 106 and the substrate 108. The request includes the obtained identifier of the output device 106 and the obtained identifier of the substrate 108. The output metadata service 104 receives the request and searches the output metadata store 110 for an entry having matching output device and substrate identifiers (e.g., an entry having the same output device identifier as the output device identifier received from the output parameter identification system 124, and having the same substrate identifier as the substrate identifier received from the output parameter identification system 124).

It should be noted that some transformation or additional processing may be performed on the output device identifier and/or the substrate identifier so that an entry from the output metadata store that matches the received output device and substrate identifiers can be identified. This transformation or additional processing can be performed by the output metadata service 104 and/or the output parameter identification system 124. For example, the output device identifiers may be stored in the output metadata store 110 using a particular format, and the output device identifier obtained by the output parameter identification system 124 is converted into that particular format.

It should also be noted that, in situations in which the substrate identifier is an image of the substrate packaging, that various public and/or proprietary object matching techniques can be used to determine whether two images are the same. For example, the substrate identifier in an entry of the output metadata store 110 can be an image of substrate packaging, and the identifier of the substrate 108 can also be an image of substrate packaging. Various object matching techniques can be used to identify features or characteristics of each of these two images, and a comparison made as to whether (based on the identified features or characteristics of the two images) the two images are the same substrate packaging. If the determination is made that the two images are the same substrate packaging then the substrate identifier of the entry matches the substrate identifier of the substrate 108. However, if the determination is made that the two images are not the same substrate packaging then the substrate identifier of the entry does not match the substrate identifier of the substrate 108.

Once the output metadata for the combination of the output device 106 and the substrate 108 is found, the output metadata service 104 returns the output metadata for the combination of the output device 106 and the substrate 108 to the output parameter identification system 124. The output metadata is then used to determine the output parameters for outputting content on the substrate 108 as discussed above.

Additionally or alternatively, rather than accessing the output metadata service 104, the output parameter identification system 124 communicates with the output metadata store 112 to obtain the output metadata for the combination of the output device 106 and the substrate 108. In such situations, any additional processing, transformation, searching, and so forth functionality described herein as performed by the output metadata service 104 would instead be performed by a module or system of the computing device 102 (e.g., the output parameter identification system 124). Thus, in such situations the functionality provided herein is supported even if the computing device 102 is in an offline scenario (e.g., access to the Internet and/or other network is not available).

In one or more embodiments, the computing device 102 maintains a record of the most recently used output metadata and/or output parameters. This record can be maintained by, for example, the application 120, the output device driver 122, and/or the output parameter identification system 124. These same output metadata and/or output parameters are re-used for subsequent content output until an indication of a change in substrate 108 is changed. A change in substrate 108 can be indicated in various manners, such as user input, refilling of an empty substrate tray, and so forth.

By maintaining a record of the most recently used output metadata and/or output parameters, a user that repeatedly uses the same output device and the same substrate can easily have content repeatedly output in a manner he or she desires. For example, a user may regularly use the same printer to print pictures on the same photo paper. The output metadata for that printer and photo paper can be obtained once, and the same output parameters repeatedly used to print out the user's pictures. Thus, for example, the user need only hit "print" on his or her smartphone or other mobile device to have a picture printed using the same printer and photo paper, and have an image printed that has appropriate color settings for that printer and photo paper combination.

Similarly, a record of the output metadata and/or output parameters used to output particular content can be saved with the content. For example, a file that includes the content can have added to it data that describes the output metadata and/or the output parameters. When the file is subsequently opened and the content output, the output parameter identification system 124 can default to using the same output metadata and/or output parameters as were saved with the content. Additionally or alternatively, when the file is subsequently opened and the content output, the output parameter identification system 124 can query the user as to whether he or she desires to use the same output metadata and/or output parameters as were saved with the content. For example, the user can be queried as to whether the same output device and substrate are being used as the last time the content was output, and if so the output parameter identification system 124 can use the same output metadata and/or output parameters as were saved with the content.

In the discussions above, the output device 106 and the substrate 108 are described as separate (e.g., the output device 106 being a printer and the substrate 108 being paper). Alternatively, in some situations the output device 106 and the substrate 108 can be treated as the same component and identified by the same or a single identifier. For example, the output device 106 may be a display device that includes as the substrate 108 an LCD panel. In this situation, the identifier of the output device 106 and the substrate 108 can be the same, and the techniques discussed herein need only use one identifier (e.g., rather than maintaining separate identifiers for the output device and the substrate because they're the same).

In one or more embodiments, the adding of output metadata for output device and substrate combinations to the output metadata store 110 and/or the changing of output metadata for output device and substrate combinations in the output metadata store 110 is restricted. This restriction can be implemented in various manners, such as by only allowing authorized entities to add to or change data in the output metadata store 110, by a trusted entity vetting or reviewing additions or changes to data in the output metadata store 110, and so forth.

Additionally, in one or more embodiments, the output parameter identification system 124 implements one or more mechanisms to ensure that the output metadata received from the output metadata service 104 is from a trusted source and has not been tampered with (e.g., by an intermediary intercepting communications between the output metadata service 104 and the computing device 102). Various different mechanisms can be implemented, such as by having the output metadata digitally signed (e.g., by the output metadata service 104 or a trusted entity that added to the output metadata store 110) and using the received output metadata only if the digital signature is verified (e.g., by the output parameter identification system 124). By way of another example, communications between the output metadata service 104 and the output parameter identification system 124 can be encrypted using any of a variety of encryption techniques.

In the discussions herein, reference is made to the output parameter identification system 124 accessing the output metadata service 104. In some situations, multiple output metadata services analogous to output metadata service 104 are used, such as a different output metadata service for each substrate manufacturer. The proper output metadata service 104 to access can be identified in various manners, such as in a QR code, bar code, or other information on the substrate packaging.

Figure 3:
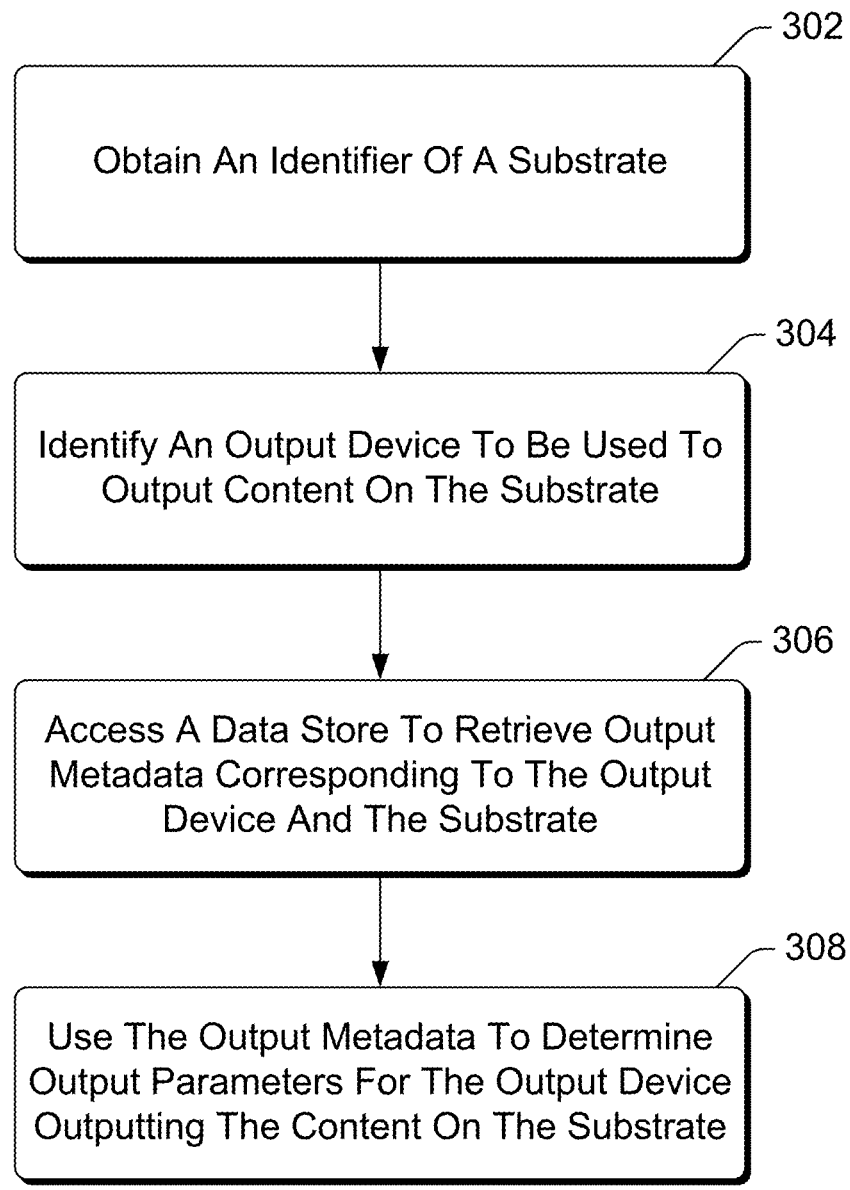
FIGS. 3 and 4 are flowcharts illustrating example processes for implementing the automatic output metadata determination based on output device and substrate in accordance with one or more embodiments.

FIG. 3 is a flowchart illustrating an example process 300 for implementing the automatic output metadata determination based on output device and substrate in accordance with one or more embodiments. Process 300 is carried out by a computing device, such as computing device 102 of FIG. 1, and can be implemented in software, firmware, hardware, or combinations thereof. Process 300 is shown as a set of acts and is not limited to the order shown for performing the operations of the various acts. Process 300 is an example process for implementing the automatic output metadata determination based on output device and substrate; additional discussions of implementing the automatic output metadata determination based on output device and substrate are included herein with reference to different figures.

In process 300, an identifier of a substrate is obtained (act 302). The substrate can be obtained in various manners as discussed above, such as by automatically obtaining the identifier of the substrate by reading a QR code or bar code on packaging of the substrate, capturing an image of the packaging of the substrate, and so forth.

An output device to be used to output content on the substrate is also identified (act 304). The output device can be identified in various manners as discussed above, such as by user input specifying the output device.

A data store is accessed to retrieve output metadata (act 306). The output metadata corresponds to both the output device identified in act 304, and the substrate identified in act 302.

The output metadata is used to determine output parameters for the output device to output content on the substrate (act 308). These output parameters can take a variety of different forms as discussed above, such as how to output particular colors.

The process 300 can be performed at various times. In one or more embodiments, process 300 is performed each time the substrate used by the output device changes. The change in substrate can be determined in various manners, such as via a user input indicating the change in substrate, a refilling of an empty substrate tray, and so forth.

Figure 4:
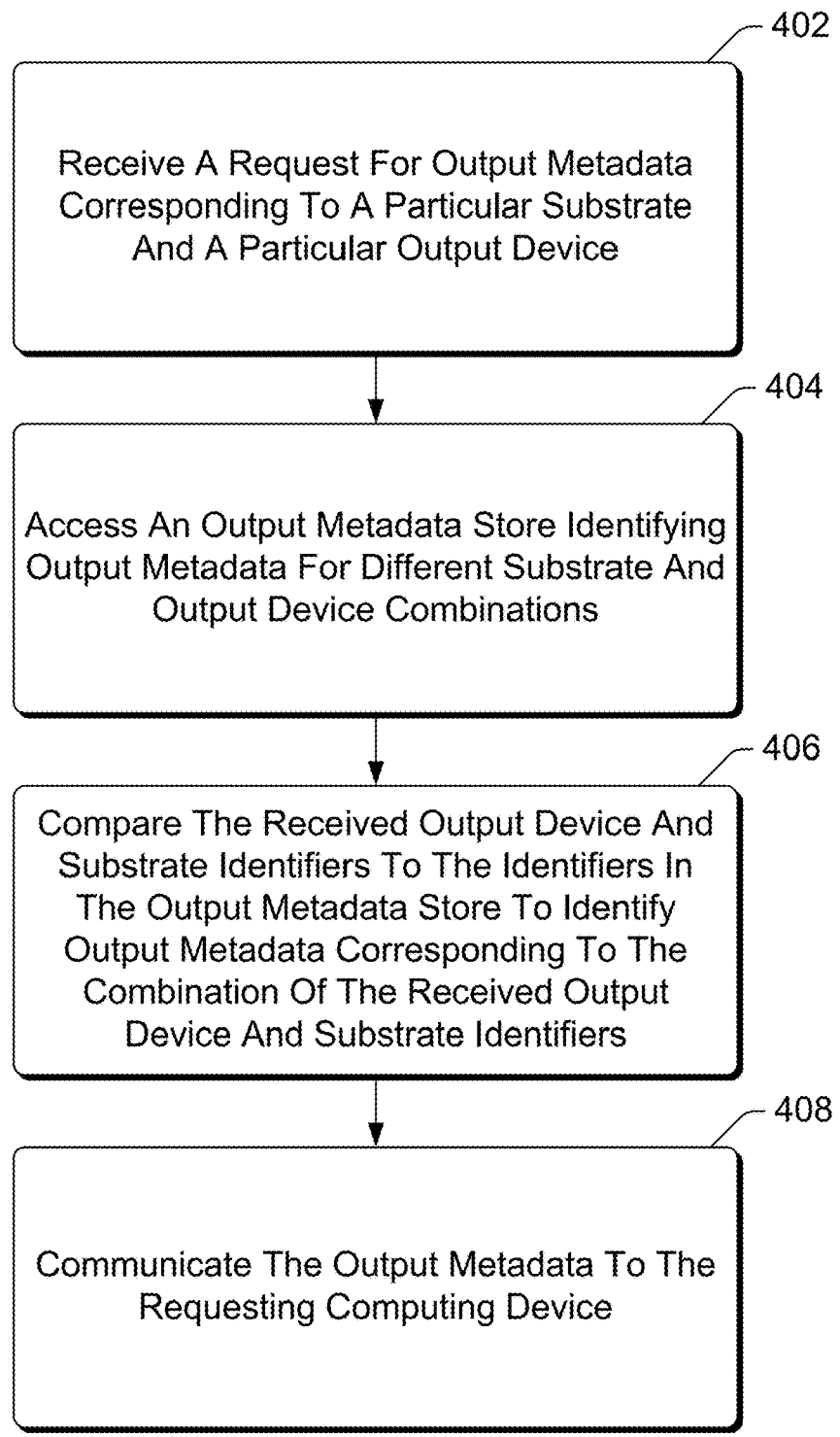

FIG. 4 is a flowchart illustrating an example process 400 for implementing the automatic output metadata determination based on output device and substrate in accordance with one or more embodiments. Process 400 is carried out by an output metadata service, such as output metadata service 104 of FIG. 1, and can be implemented in software, firmware, hardware, or combinations thereof. Process 400 is shown as a set of acts and is not limited to the order shown for performing the operations of the various acts. Process 400 is an example process for implementing the automatic output metadata determination based on output device and substrate; additional discussions of implementing the automatic output metadata determination based on output device and substrate are included herein with reference to different figures.

In process 400, a request for output metadata corresponding to a particular substrate and a particular output device is received (act 402). This request is received from a computing device as discussed above.

An output metadata store is accessed (act 404). The output metadata store includes output metadata for different substrate and output device combinations. The output metadata store can be organized as records, entries, or other data structures as discussed above.

The received output device and substrate identifiers are compared to the identifiers in the output metadata store (act 406). This comparison is made to identify output metadata corresponding to the combination of the output device and substrate identifiers received in act 402.

The identified output metadata is returned to the requesting computing device (act 408). This requesting computing device is the computing device from which the request was received in act 402.

It should be noted that, using the techniques discussed herein, substrate manufacturers can adjust to changes in the substrate and have users continue to have accurate and appealing content output despite the substrate change. Changes in substrate can occur for various reasons, such as differences in materials used to make the substrate (e.g., trees used to make paper coming from different geographic locations). If there is a change to the substrate, a different QR code, bar code, substrate packaging, and so forth can be used for the new substrate. The correct output metadata is automatically obtained for the user, and the user continues to have accurate and appealing content despite the substrate change (and the user may not even have knowledge of the substrate change).

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
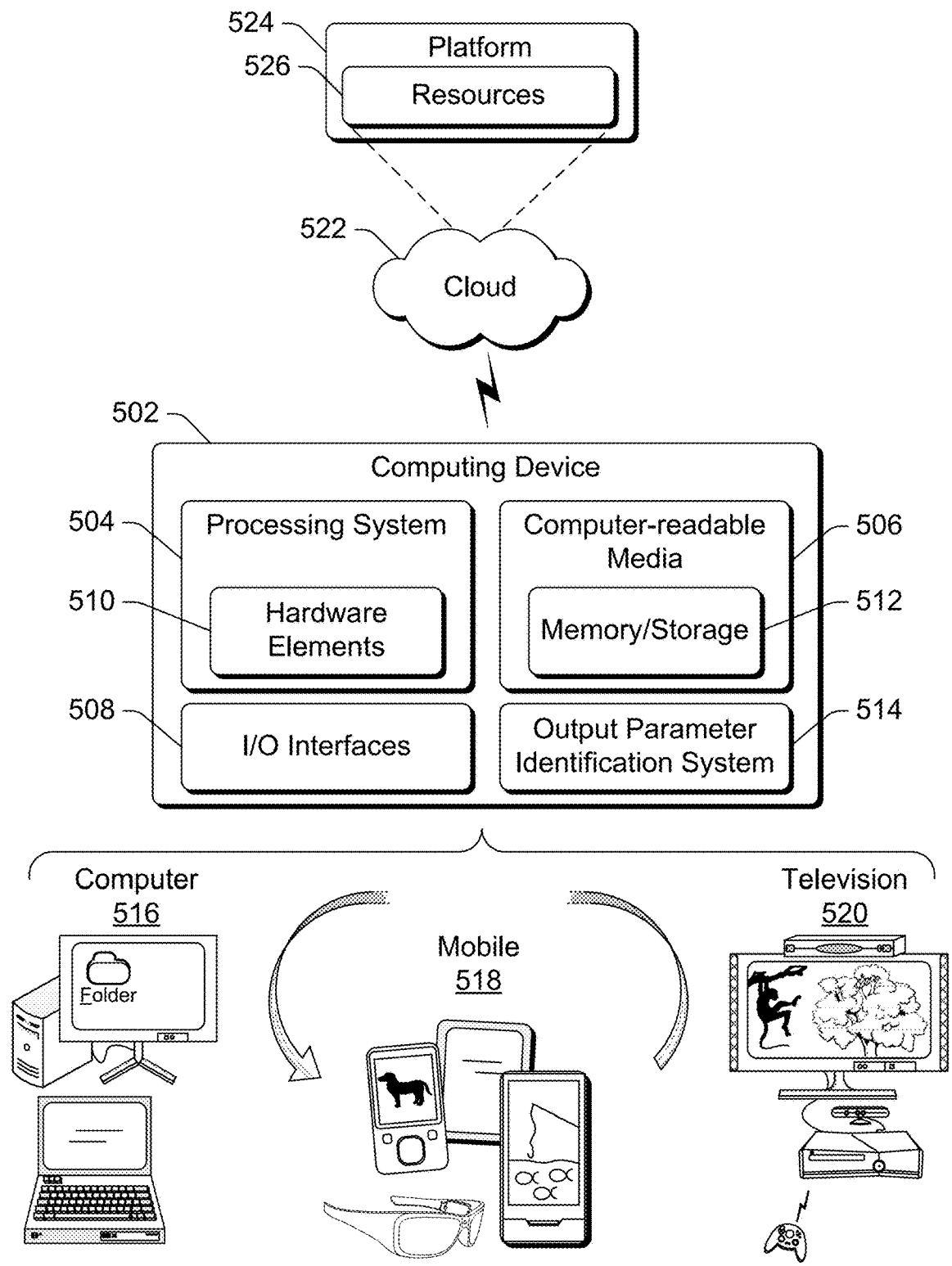
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Resistive RAM (ReRAM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

The one or more input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

The computing device 502 also includes an output parameter identification system 514. The output parameter identification system 514 provides various functionality for obtaining output device and substrate identifiers, and communicating with a output metadata service to obtain output metadata for an output device and substrate combination as discussed above. The output parameter identification system 514 can implement, for example, the output parameter identification system 124 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, eyeglasses or head-mounted display (e.g., virtual reality (VR) or augmented reality (AR) eyeglasses or head-mounted displays), and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: automatically obtaining an identifier of a substrate on which content is to be output, the identifier of the substrate being obtained from packaging of the substrate; identifying an output device to be used to output the content on the substrate; accessing a data store to retrieve output metadata, the output metadata corresponding to both the substrate and the output device; and using the output metadata to determine output parameters for the output device to output the content on the substrate.

Alternatively or in addition to any of the above described methods, any one or combination of: the using the output metadata to determine output parameters comprising communicating the output metadata to an output device driver for determination of the output parameters; the method implemented by a printer driver; the output metadata including a type of the substrate and a color profile for the substrate; the identifying the output device comprising receiving a user input specifying the output device; the obtaining the identifier of the substrate comprising reading a quick response (QR) code on the packaging of the substrate, the quick response code encoding the identifier of the substrate; the obtaining the identifier of the substrate comprising reading a bar code on the packaging of the substrate, the bar code encoding the identifier of the substrate; the obtaining the identifier of the substrate comprising capturing an image of the packaging of the substrate and communicating the captured image to a service including the data store; the output device comprising a printer; the identifier of the output device comprising a manufacturer and model of the output device; the data store comprising a remote data store.

A computing device comprising: an output parameter identification system configured to obtain an identifier of a substrate on which content is to be output, to identify a display device to be used to output the content on the substrate, and to access a data store to retrieve output metadata, the output metadata corresponding to both the substrate and the display device; and a display device driver configured to use the output metadata to determine output parameters for the display device to output the content on the substrate.

Alternatively or in addition to any of the above described computing devices, any one or combination of: the output parameter identification system being included as part of the display device driver; the display device comprising a projector and the substrate comprising a screen onto which the projector displays content; the output metadata including a color profile for the substrate; the data store comprising a remote date store.

A method comprising: receiving, from a computing device, a request for print metadata corresponding to a particular substrate and a particular printer, the request including an identifier of the particular printer and an identifier of the particular substrate, the identifier of the particular substrate having been automatically obtained from packaging of the substrate or the particular printer; accessing a print metadata store including multiple entries, each entry identifying print metadata for an identified substrate and an identified printer; comparing the received identifier of the particular printer to the identifiers of printers in the multiple entries and comparing the received identifier of the particular substrate to the identifiers of substrates in the multiple entries to identify an entry corresponding to the particular printer and the particular substrate; and communicating, to the computing device, the print metadata included in the entry corresponding to the particular printer and the particular substrate.

Alternatively or in addition to any of the above described methods, any one or combination of: the identifier of the particular substrate comprising a captured image of packaging of the substrate, and each of the multiple entries including an image of packaging of the identified substrate for the entry; the identifier of the substrate comprising an identifier encoded in a quick response (QR) code on the packaging of the substrate; the identifier of the substrate comprising an identifier encoded in a bar code on the packaging of the substrate; the print metadata including a type of the substrate and a color profile for the substrate; the print metadata including a link to a color profile for the substrate; the computing device comprising a remote computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, from a computing device, a request for print metadata corresponding to a particular substrate and a particular printer, the request including a first identifier that corresponds to the particular printer and a second identifier that corresponds to the particular substrate;
   accessing a print metadata store including multiple entries that correspond to a plurality of different printers and a plurality of different substrates, individual entries identifying print metadata that describes how an identified printer is to output color on an identified substrate;

comparing the first identifier to the plurality of different printers that are listed in the multiple entries and comparing the second identifier to the plurality of different substrates that are listed in the multiple entries to identify a particular entry, of the multiple entries, that corresponds to the particular printer that is identified in the request for the print metadata and the particular substrate that is identified in the request for the print metadata; and communicating, to the computing device, the print metadata included in the particular entry corresponding to the particular printer and the particular substrate.

2. The method as recited in claim 1, wherein the second identifier of the particular substrate comprises a captured image of packaging of the particular substrate.

3. The method as recited in claim 1, wherein the second identifier of the particular substrate comprises an identifier encoded in a quick response (QR) code on a substrate packaging that contains the particular substrate.

4. The method as recited in claim 1, wherein the second identifier of the particular substrate comprises an identifier encoded in a bar code on a substrate packaging that contains the particular substrate.

5. The method as recited in claim 1, wherein the print metadata indicates at least: a type of the particular substrate and a color profile for the particular substrate.

6. The method as recited in claim 1, wherein the print metadata indicates at least a link to a color profile for the particular substrate.

7. The method as recited in claim 1, wherein at least some of the multiple entries that are included within the print metadata store describe how a corresponding identified printer is to deposit ink onto a corresponding type of paper.

8. The method as recited in claim 1, wherein the second identifier that corresponds to the particular substrate is obtained via a camera that is deployed to:
read a QR code on a substrate packaging that contains the particular substrate; or
read a bar code on the substrate packaging that contains the particular substrate.

9. The method as recited in claim 8, wherein the substrate packaging is a box or an envelope that contains the particular substrate.

10. A computing device for communicating output parameters to a printer based on print metadata that is maintained by an output metadata service for a plurality of substrate and printer combinations, the computing device comprising:
one or more processors;
a memory in communication with the one or more processors, the memory storing computer-readable instructions stored thereupon which, when executed by the one or more processors, cause the computing device to:
obtain an identifier of a substrate onto which content is to be printed, wherein the identifier of the substrate is obtained from a substrate package that contains the substrate;
obtain an identifier of the printer that is to be used to print the content onto the substrate;
transmit, to the output metadata service, a request for particular print metadata that is stored in association with a particular entry, of a metadata store, that includes:
the identifier of the substrate, and
the identifier of the printer;
receive, from the output metadata service based on the request, the particular print metadata;
determine the output parameters based on the particular print metadata that is received from the output metadata service, wherein the output parameters indicate one or more color adjustments for the printer to use when printing the content onto the substrate; and
transmit the output parameters to the printer to enable the printer to accommodate for one or more characteristics of the substrate when printing the content onto the substrate based on the one or more color adjustments.

11. The computing device of claim 10, wherein the output parameters are transmitted to the printer through a printer driver that is installed on the computing device and that serves as an interface between the printer and an application that is usable to view the content.

12. The computing device of claim 11, wherein the printer driver determines the output parameters based on the particular print metadata that is received from the output metadata service.

13. The computing device of claim 11, wherein the output metadata service is executed by one or more server computers that are remote from the computing device on which the printer driver is installed.

14. The computing device of claim 10, wherein obtaining the identifier of the substrate onto which the content is to be printed includes deploying a camera of the computing device to read:
a quick response (QR) code from the substrate package that contains the substrate, or
a bar code from the substrate package that contains the substrate.

15. The computing device of claim 12, wherein obtaining the identifier of the printer that is to be used to print the content onto the substrate includes receiving a user input specifying the printer.

16. The computing device of claim 10, wherein the identifier of the printer indicates at least a manufacturer and model of the printer.

17. The computing device of claim 10, wherein the one or more characteristics of the substrate include at least an International Color Consortium (ICC) color profile for which the one or more color adjustments accommodate when printing the content onto the substrate.

18. The computing device of claim 10, wherein the particular print metadata indicates at least some of the one or more characteristics of the substrate.

19. The computing device of claim 18, wherein the one or more characteristics of the substrate include at least one of a thickness of the substrate or an absorbance of substrate.

20. The computing device of claim 10, wherein at least some of the particular print metadata is provided to the output metadata service by a manufacturer of the substrate to facilitate generation of the output parameters that enable the printer to accommodate for the one or more characteristics of the substrate when printing the content onto the substrate.

* * * * *